US 6,697,541 B1

(12) United States Patent
Chen et al.

(10) Patent No.: US 6,697,541 B1
(45) Date of Patent: Feb. 24, 2004

(54) AMPLITUDE TUNABLE FILTER

(75) Inventors: Gang Chen, Horseheads, NY (US);
Steven B. Dawes, Corning, NY (US);
Glenn E. Kohnke, Painted Post, NY (US); Laura A. Weller-Brophy, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/569,647

(22) Filed: May 12, 2000

Related U.S. Application Data
(60) Provisional application No. 60/134,565, filed on May 17, 1999.

(51) Int. Cl.[7] ............................................. G02F 1/295
(52) U.S. Cl. ........................................... 385/4; 385/37
(58) Field of Search ............................ 385/37, 31, 128, 385/12, 43

(56) References Cited

U.S. PATENT DOCUMENTS

| | | | |
|---|---|---|---|
| 5,007,705 A | 4/1991 | Morey et al. | ............. 350/96.29 |
| 5,647,039 A | 7/1997 | Judkins et al. | ................ 385/37 |
| 5,864,641 A | 1/1999 | Murphy et al. | ................ 385/12 |
| 5,898,517 A | 4/1999 | Weis | .......................... 356/5.09 |
| 5,912,910 A | 6/1999 | Sanders et al. | ................ 372/22 |
| 5,999,671 A | * 12/1999 | Jin et al. | ...................... 385/37 |
| 6,058,226 A | 5/2000 | Starodubov | ................... 385/12 |
| 6,097,862 A | * 8/2000 | Abramov et al. | .............. 385/37 |
| 6,201,918 B1 | * 3/2001 | Berkey et al. | .............. 385/128 |
| 6,301,408 B1 | * 10/2001 | Espindola et al. | ............ 385/37 |

OTHER PUBLICATIONS

H. S. Kim et al., "Actively gain–flattened Erbium–doped fiber amplifier over 35 nm by using all–fiber acoustooptic tunable filters," IEEE Phot. Tech. Lett. 10, 790–792 (1998).
D. M. Costantini et al., "Tunable loss filter based on metal coated long period gratings," ECOC '98 391–392 (1998).
O. Duhem et al., "Long period copper–coated grating as an electrically tunable wavelength–selective filter," Elec. Lett. 35, 1014–1016 (1999).
A. A. Abramov et al., "Temperature–sensitive long–period fiber gratings for wideband tunable filters," OFC '99 ThJ5 (1999).

\* cited by examiner

*Primary Examiner*—Euncha Cherry
(74) *Attorney, Agent, or Firm*—Svetlana Z. Short

(57) ABSTRACT

A dynamically tunable filter controls the magnitude of couplings between core and cladding modes of a waveguide by surrounding the waveguide with an overcladding having an adjustable refractive index. The coupled modes are attenuated along the core to produce the desired spectral response. The adjustment to the overcladding index is made in a range that is above the refractive index of the underlying cladding to vary amplitudes of attenuated bands of wavelengths without shifting central wavelengths of the bands.

70 Claims, 6 Drawing Sheets

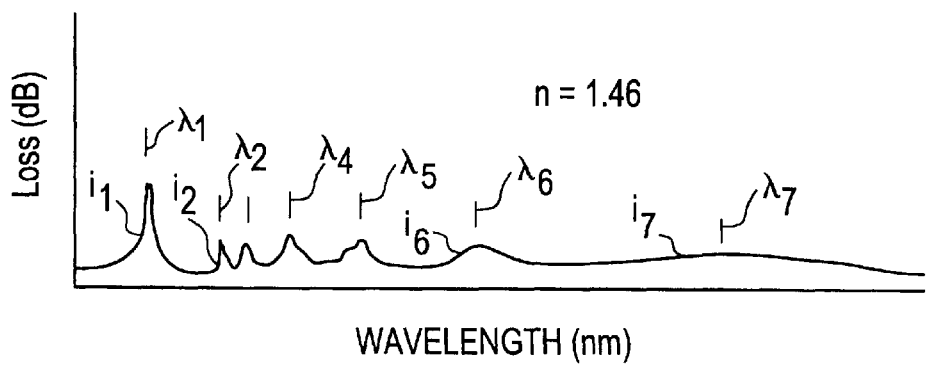
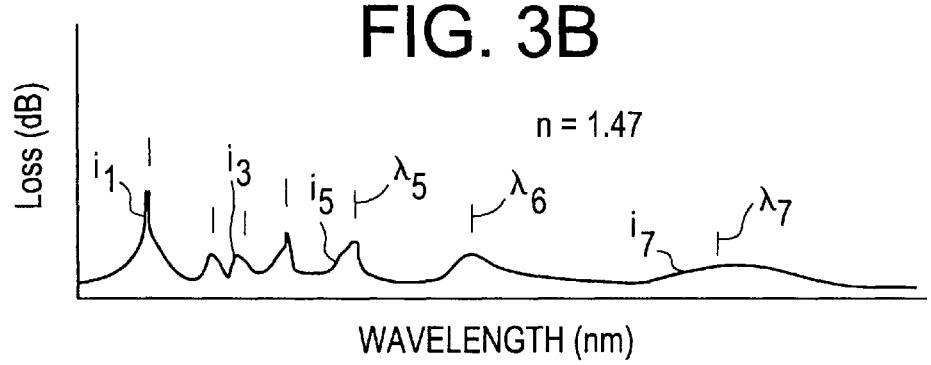

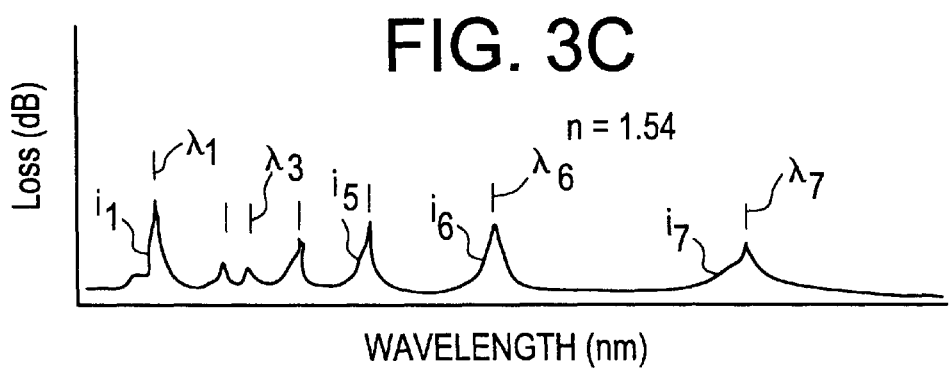
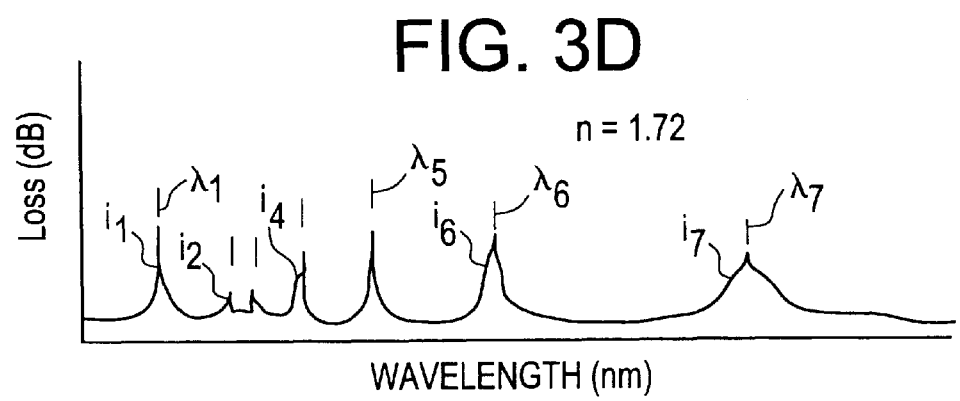

AMPLITUDE TUNABLE FILTER

This application claims the benefit of U.S. Provisional Patent Application No. 60/134,565, filed May 17, 1999.

FIELD OF THE INVENTION

The coupling of light between core and cladding layers of optical waveguides influences spectral transmission characteristics of the waveguides. External controls modify coupling parameters to change or "tune" the transmission characteristics.

BACKGROUND OF THE INVENTION

Spectral transmission characteristics are influenced by waveguide (e.g., fiber) materials and geometries; in-line optical devices including routers, filters, and amplifiers: and environmental factors, as well as various interactions with the signals themselves. Optical amplifiers often produce substantially unequal gain over a operating spectral range and are paired with gain flattening filters including thin films, long period gratings, and fiber Bragg gratings to preserve desired spectral characteristics.

Additional gain flattening is sometimes needed at a system level, particularly in undersea applications. Gain ripples of amplifiers chained together as well as other in-line system anomalies accumulate and produce a system ripple that can also be mitigated by other gain flattening filters. The filters have fixed spectral responses that can be matched to particular system requirements. However, some system-wide changes, as well as other changes more pronounced locally, vary over time. Changing environmental conditions and system perturbations, including aging of the system, can alter the spectral transmission profiles of systems in transient and unpredictable ways. Dynamic tuning of the spectrum is needed to maintain system stability.

Tunable filters, particularly tunable fiber Bragg gratings, are available with spectral responses that can be shifted along the spectrum. Filter gratings are tuned by varying their periodicity under the control of an external force such as compression or stress. However, the system spectral transmission characteristics that vary over time are not easily counteracted by the shifting of narrow attenuation bands. Especially with respect to closely spaced signals along the spectrum, shifting attenuation bands can disturb adjacent signals. Some short period gratings attenuate spectral bands by reflection, which require additional system complexity to accommodate or remove the reflected light.

SUMMARY OF INVENTION

Improved tuning capabilities are provided in accordance with our invention largely by scaling filter responses rather than shifting the responses in wavelength. Within predetermined wavelength domains, the overall amplitudes of attenuated spectral bands can be increased or decreased without significantly altering the central wavelengths of the attenuated bands. The bands can be attenuated by dissipation rather than reflection, and our new amplitude tunable filters can be combined with other tunable or passive filters to provide a broader system response or to individually adjust transmission characteristics of different channels.

Our preferred embodiments rely on a special coupling mechanism having advantages for dynamic tuning that have been overlooked until now. Long period gratings, tapered pathways, and other perturbations can be used along optical waveguides to couple light from cores into surrounding claddings. Ambient conditions surrounding the claddings affect the cladding modes.

For example, a paper entitled "Displacements of the resonant peaks of a long-period fiber grating induced by a change of ambient refractive index" published in Optics Letters, Vol. 22, No. 23, on Dec. 1, 1997, discusses the effects of surrounding the cladding of a long period grating with mediums having different ambient refractive indices. Below the refractive index of the cladding, the cladding mode attenuation bands shift toward the lower wavelengths and decrease in amplitude as the ambient index approaches the cladding index. The attenuation bands substantially disappear at an ambient index matching the cladding index because the cladding modes are no longer guided. Above the refractive index of the cladding, the attenuation bands reappear and increase in amplitude with further increases in the ambient index but do not shift in wavelength. We exploit this latter spectral coupling behavior in the preferred embodiments of our new amplitude tunable filter.

One such embodiment of our amplitude tunable filter has a waveguide including a core and cladding that guide a light beam having a range of wavelengths along the core. A coupler couples at least one band of the wavelengths from the core into the cladding. An overcladding covers at least a portion of the cladding and exhibits a refractive index that is higher than a refractive index of the cladding. In addition, the refractive index of the overcladding is subject to change by an external control. A controller for this purpose adjusts the refractive index of the overcladding within a range that is higher than the refractive index of the cladding to vary the amplitude of the cladding-coupled band without significantly shifting the central wavelength of the band.

The coupler is preferably a long period grating formed along the waveguide but could also be a tapered or lattice filter, a fused fiber device, or other coupling structure that couples core transmissions into cladding modes. The coupler is located along the waveguide within a region covered by the overcladding and is preferably athermalized to inhibit a shift in the central wavelength of the coupled band as a function of waveguide temperature. In contrast, the overcladding preferably exhibits a refractive index that varies substantially as a function of temperature. In a preferred embodiment the overcladding is an organic containing optical material having a negative dn/dT. A particularly preferred embodiment of the overcladding is an inorganic-organic hybrid material, referred to as a hybrid sol gel material, having a refractive index (e.g., 1.47–1.55) that is substantially higher than a typical silica cladding and a rate of index change with temperature (dn/dT) of approximately $-3 \times 10^4$. The hybrid material preferably includes an extended matrix containing silicon and oxygen atoms with at least some of the silicon atoms being directly bonded to substituted or unsubstituted hydrocarbon moieties. In a solid form, the hybrid material provides structural support and protection for the underlying layers of core and cladding and can also be formulated to resist bending for safeguarding grating performance.

The controller preferably operates a temperature conditioner that adjusts the temperature of the overcladding to vary the refractive index of the overcladding within the range that is higher than the refractive index of the cladding. For example, the temperature conditioner can be formed as a resistive heater in thermal contact with the overcladding. Other heaters or coolers could be used to produce a desired range of temperature variation in the overcladding corresponding to a range of overcladding refractive indices that are above the cladding.

Our invention can also be described as a system that adjusts amplitudes of cladding mode coupled wavelengths of a light beam without significantly shifting the coupled wavelengths of the beam. The adjustment is accomplished by modifying a coupling between a core and a cladding with an overcladdihg having a refractive index that is higher than a refractive index of the cladding. The overcladding refractive index is subject to change as a function of an external control that is provided for varying the refractive index of the overcladding within a range of refractive indices that are greater than the refractive index of the cladding.

A baseline system-wide spectral response is preferably provided by a combination of passive filters. Variations of the system response from the baseline are counteracted by one or more amplitude tunable filters. Preferably, a plurality of amplitude tunable filters are concatenated in line with the passive filters to produce a combined spectral response. Each of the amplitude tunable filters preferably attenuates a substantially unique band of the system spectrum. Amplitudes of the attenuated bands can be individually adjusted to maintain desired spectral transmission characteristics.

BRIEF DESCRIPTION OF THE DRAWINGS

FIGS. 3A–3D are graphs of potential filter responses comparing the effects of different overcladding refractive indices within a range that is higher than the refractive index of an underlying cladding.

DETAILED DESCRIPTION OF THE INVENTION

Figure 1:
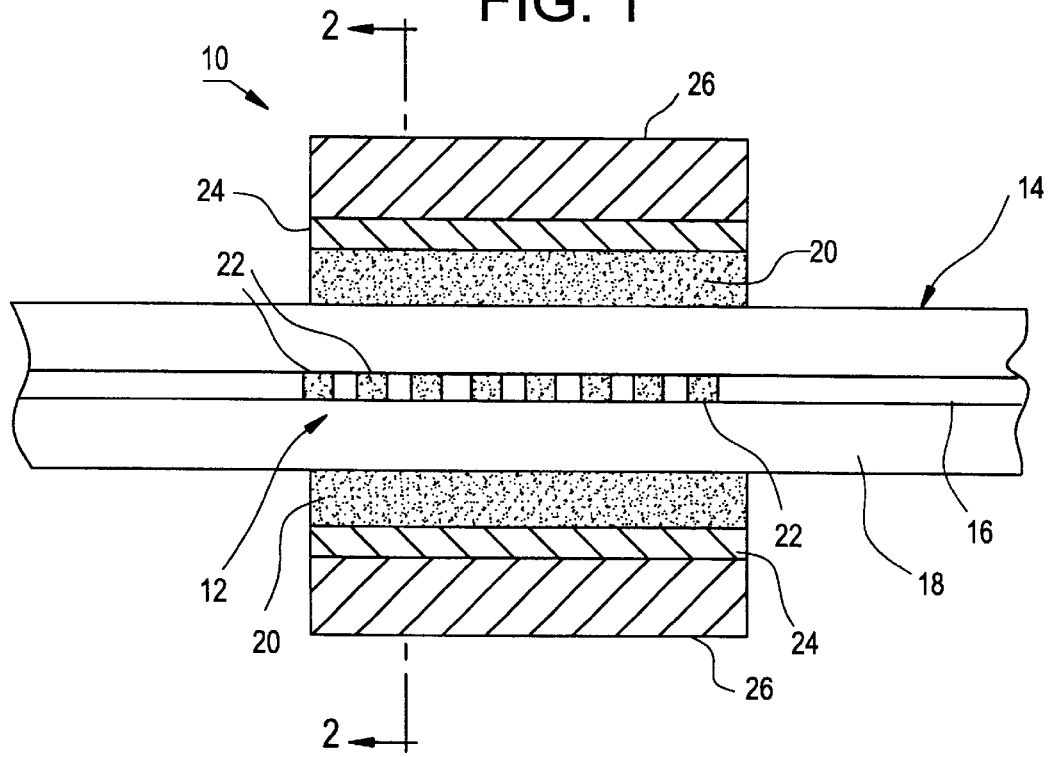
FIG. 1 is an axial sectional view of our amplitude tunable filter including an athermalized fiber grating surrounded by an overcladding and a thermal conditioner.
Figure 2:
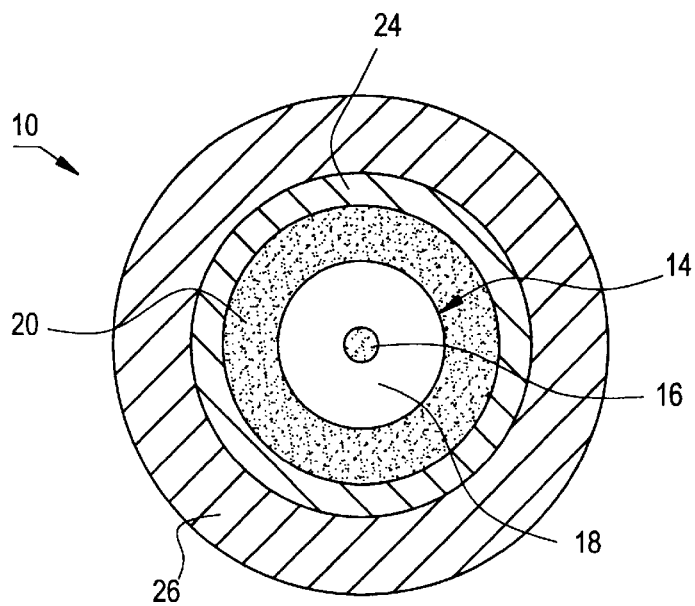
FIG. 2 is a traverse cross-sectional view of the filter taken along line 2—2 of FIG. 1.

Amplitude tunable filter 10 as shown in FIGS. 1 and 2 includes a long period grating 12 formed in an athermalized waveguide 14—a waveguide arranged to inhibit thermal spectral shifts. A preferred example of such an athermalized waveguide 14 is disclosed in U.S. patent application No. 08/989,200 entitled "Athermalized Codoped Optical Waveguide Device", filed on Dec. 11, 1997, and which is hereby incorporated by reference. According to this example, both a core 16 and a surrounding cladding 18 of the waveguide 14 are formed primarily of silica. However, the core 16 is doped with an index-raising dopant such as $GeO_2$ to allow light to be guided and codoped with a dopant such as of $B_2O_3$ to counteract the thermal effects of the index-raising dopant. A molar ratio of the dopant to the codopant is preferably in a range from 1.5:1 to 8:1, selected to neutralize the waveguide's thermal sensitivity.

The athermalized waveguide 14 can be made with a flame hydrolysis apparatus using an outside vapor deposition method to form the silica core 16 doped with $GeO_2$ and codoped with $B_2O_3$. The silica cladding 18, which can be similarly formed, preferably contains some smaller concentrations of $B_2O_3$ to further stabilize the waveguide 14. Vaporous feedstock levels of these materials are delivered to a flame hydrolysis burner to provide the desired material concentrations in the core 16 and the cladding 18. Other waveguide athermalizing approaches could also be used including compensating for thermally induced variations in refractive index with variations in strain.

The $GeO_2$ concentrations in the core 16 also provide photosensitivity for writing the long period grating 12. The core 16 is exposed to periodic bands of ultraviolet light that alter the refractive index of alternating axial portions 22 of the core 16. The alternating portions 22 can be individually exposed by relatively moving the waveguide 14 and an ultraviolet source or collectively exposed by using masking techniques.

Surrounding the waveguide 14 within the region of the long period grating 12 is an overcladding 20 having a refractive index that is higher than the refractive index of the cladding 18. The index of the overcladding 20 is preferably sensitive to temperature changes and exhibits a change in refractive index proportional to changes in temperature. Our preferred overcladding is a hybrid sol gel material, preferably in a solid form, combining organic and inorganic compounds described in U.S. Pat. No. 5,991,493 entitled "Hybrid Organic-Inorganic Planar Optical Waveguide Device", which is hereby incorporated by reference. Additional applications disclosing similar materials also appropriate for use as the overcladding 20 are found in U.S. application Ser. No. 09/494,073 which claims priority to U.S. Provisional Application No. 60/118,946, filed Feb. 5, 1999, and International Application PCT/US97/22760, filed Dec. 12, 1997. These applications too are hereby incorporated by reference.

The sol gel material preferably comprises an extended matrix containing silicon and oxygen atoms with at least some of the silicon atoms being directly bonded to substituted or unsubstituted hydrocarbon moieties. The refractive index of the sol gel material can be set over a wide range including a range from just above the refractive index of the silica cladding 18 through approximately 1.55, measured at 588 nm. Adjustments to the refractive index can be made by incorporating aryltrialkoxysilanes (particularly phenyltrialkoxysilate) or aryltrifluorosilanes (particularly phenyltrifluorosilane), which can be bound in increasing proportion to the silicon for raising the refractive index.

For example, a target index of approximately 1.47 at 20° centigrade for a wavelength of 1550 nm can be set for the sol gel material, which is determined compositionally by the ratio of phenyl to methyl groups formulated. A composition made from 8 mole % polydimethylsiloxane, 52% methyltriethoxysilane, 31% phenyltriethoxysilane, and 9% phenyltrifluorosilane can be combined and hydrolyzed to form the sol gel material with the referenced index at 1.47.

FIGS. 3A–3D, which plot the exemplary effects of discrete changes in the refractive index "n" of a surrounding medium on different cladding modes, are redrawn from a paper entitled "Analysis of the Response of Long Period Fiber Gratings to External Index of Refraction" published in Journal of Lightwave Technology, Vol. 16, No. 9, September 1998. This paper is hereby incorporated by reference. Because of different mode field distributions, the higher order modes "$i_4$–$i_7$" are more susceptible to the external index change than the lower order modes "$i_1$–$i_3$". Also of particular importance, central wavelengths "$\lambda_1$–$\lambda_5$" of all of the bands "$i_1$–$i_7$" remain substantially unchanged. Our tunable filter 10 preferably operates within a range (e.g., "$i_4$–$i_7$") at which variations in the refractive index of the overcladding 20 produce substantial changes in the amplitude of the cladding-coupled bands.

The refractive index of the sol gel material is sensitive to temperature at a rate of change of approximately $-3 \times 10^{-4}/°$C.=dn/dT, where "dn" is the change in refractive index and "dT" is the temperature change in centigrade. Increasing the temperature of the sol gel material of the overcladding 20 reduces both the coupling strength and the corresponding amount of attenuation of the longer coupled spectral bands without shifting the central wavelengths of these bands.

Other materials, particularly polymers, could also be used as the overcladding 20 to provide similar variations in refractive index as a function of temperature. Polymers with temperature-sensitive refractive indices (e.g., UV-curable acrylate-based polymers) are disclosed in a paper entitled "Widely tunable long-period fibre gratings" by A. A. Abramov et al., published by Electronics Letters, Jan. 7, 1999, Vol. 35, No. 1, which is hereby incorporated by reference. The refractive indices of the polymers are preferably adjusted to vary within a range above the refractive index of silica —the preferred cladding material.

In thermal contact with the overcladding 20 is a temperature conditioner 24, such as a resistive heater. Electrical current flow to the heater can be controlled to adjust the temperature of the overcladding 20 and to produce a corresponding change in the refractive index of the overcladding 20. A cooler could also be used in place of or in addition to the heater to vary the overcladding temperature over a wider range. However, the amount of overcladding temperature variation is preferably within a range at which the grating 12 is athermalized to avoid wavelength shifts caused by temperature variations in the core 16 and cladding 18. The temperature conditioner 24 can be formed inside a tube 26 housing that provides structural support to prevent bending or other disturbances to the grating 12. A separate mounting could also be used such as by attaching the waveguide 14 to a rigid substrate (e.g., a glass plate).

Thus, the spectral bands, which are subject to varying amounts of attenuation, are protected against shifts in wavelength in several ways. The grating waveguide 14 is athermalized. The refractive index of the overcladding 20 varies in a range above the refractive index of the cladding 18. Also, the waveguide 14 is supported against bending. The thermal protection of the waveguide 14 is needed because of the temperature variation undergone by the overcladding 20 to control the amplitudes of the spectral bands. However, other mechanisms including pressure and electro-optic mechanisms could also be used with other overcladding materials to control refractive index.

Figure 4:
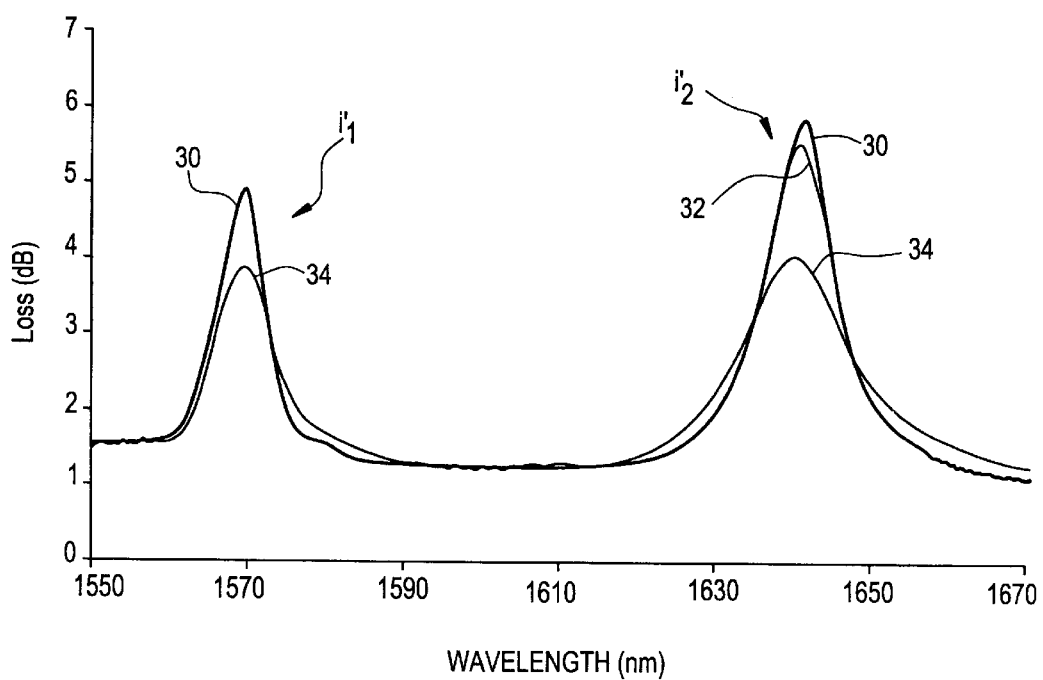
FIG. 4 is a graph of the filter response over a shorter domain of wavelengths comparing the effects of three different temperatures of the overcladding.

FIG. 4 plots the spectral response of the amplitude tunable filter 10 at three different temperatures in terms of decibel loss over a domain of wavelengths. Two spectral bands "$i'_1$" and "$i'_2$" are evident. The three plots 30, 32, and 34, corresponding to temperatures of $-10°$, $20°$, and $80°$ centigrade, show the most differences within the higher spectral band "$i'_2$". At $-10°$, the spectral band "$i'_2$" exhibits a spectral loss of 6 decibels; and at $80°$, the loss is less than 4 decibels. Again, the higher order cladding mode shows more pronounced amplitude effects with temperature. Higher order modes, however, also exhibit progressively reduced stability and are subject to environmental interactions. Thus, a compromise is required between amplitude control and filter stability.

The operating range of the amplitude tunable filter 10 as a band-rejection filter can be selected from the design of the grating 12 to cover a desired range of attenuations. The overcladding 20 preferably covers the entire length of the grating 12 but could cover shorter lengths to provide chirping of the response.

Figure 5:
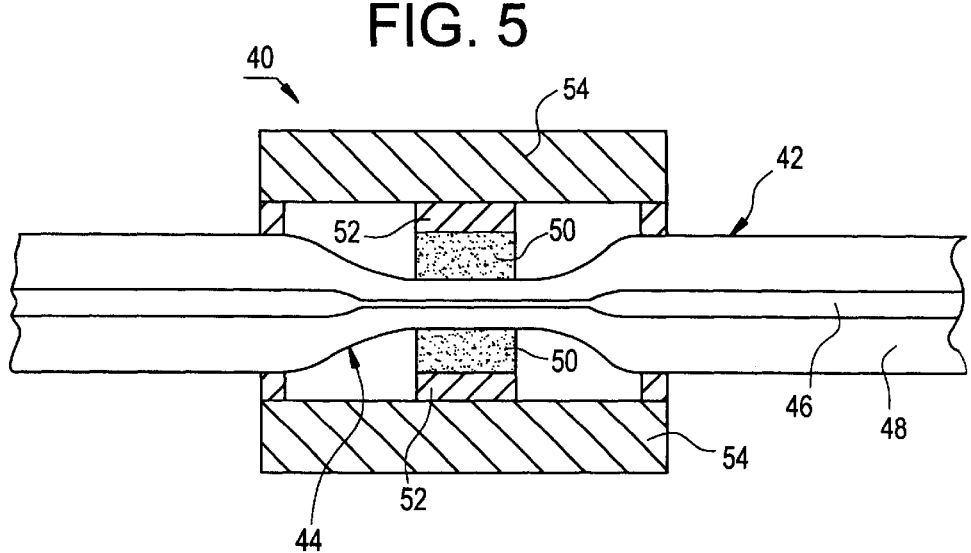
FIG. 5 is an axial cross-sectional view of an amplitude tunable tapered filter also surrounded by a temperature-controlled overcladding.

An alternative amplitude tunable filter 40 shown in FIG. 5 is formed along a waveguide 42 having a tapered section 44 to force coupling from a core 46 into a cladding 48. A temperature-sensitive overcladding 50, such as a sol gel material, surrounds the tapered section 44. The overcladding 50 exhibits a refractive index above a refractive index of the cladding 48 and varies in refractive index as a function of temperature within a range that preferably remains above the refractive index of the cladding 48. A temperature conditioner 52, such as a heater or cooler, controls the temperature of the overcladding 50 to adjust the amplitudes of spectral bands attenuated by the filter 40. A tube 54 provides structural support.

The spectral bands, which correspond to the cladding modes coupled by the filter 40, are affected by design considerations including the taper dimensions and refractive index profiles of the core 46 and the cladding 48, as well as the dimensions and refractive index of the overcladding 50. Once selected, however, the spectral locations of the bands are preferably invariant to changes in temperature or changes in the refractive index of the overcladding 50 within a range of refractive indices greater than the refractive index of the cladding 48. Other mechanisms including pressure or electro-optic effects could be used in place of temperature to provide the desired control over the refractive index of the overcladding 50.

The amplitude control provided by the filter 40 and other filters capable of attenuating a range of wavelengths can also be used to affect the overall shape (e.g., tilt) of the filter response. The resulting attenuation can be wavelength dependent (e.g., attenuation increasing with wavelength) producing a sloped filter response. Other effects on the shape of the filter response can be made by adjusting the position, length, or axial thickness profile of the overcladding with respect to the underlying coupler.

Figure 6:
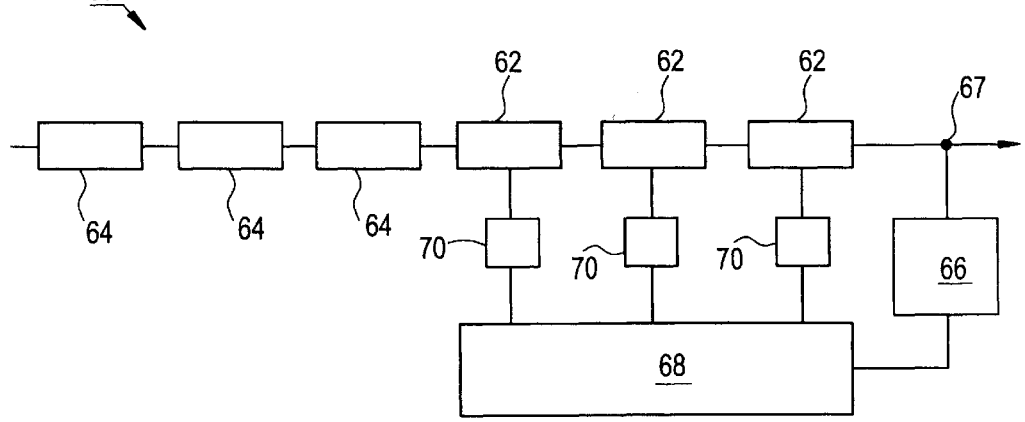
FIG. 6 is a diagram of an optical system incorporating a plurality of our amplitude tunable filters in combination with a plurality of conventional filters.

As shown in FIG. 6, our new amplitude optical filters 62 can be used in combination with conventional filters 64 to control the overall spectral response of an optical system 60. The conventional filters 64 compensate for a steady-state portion of system response error, and our amplitude tunable filters cover portions of the system spectrum subject to variation over time. Filter response depth is preferably limited to reduce polarization dependent losses. However, the desired dynamic range of amplitude variation can be achieved by combining more than one of the amplitude tunable filters 62 for variably attenuating the same spectral band.

A system spectral response monitor 66 connected through a fiber coupler 67 (such as a one percent tap) is combined with a processor 68 and an array of drivers 70 (such as heater drivers) for controlling our new amplitude tunable filters 62, which function together as a dynamic equalizer, to respond to system spectral amplitude variations. The monitoring and subsequent amplitude control of the system spectral response can take place continuously, or the monitoring can be intermittent to adjust the response of our amplitude tunable filters 62 more infrequently.

Figure 7:
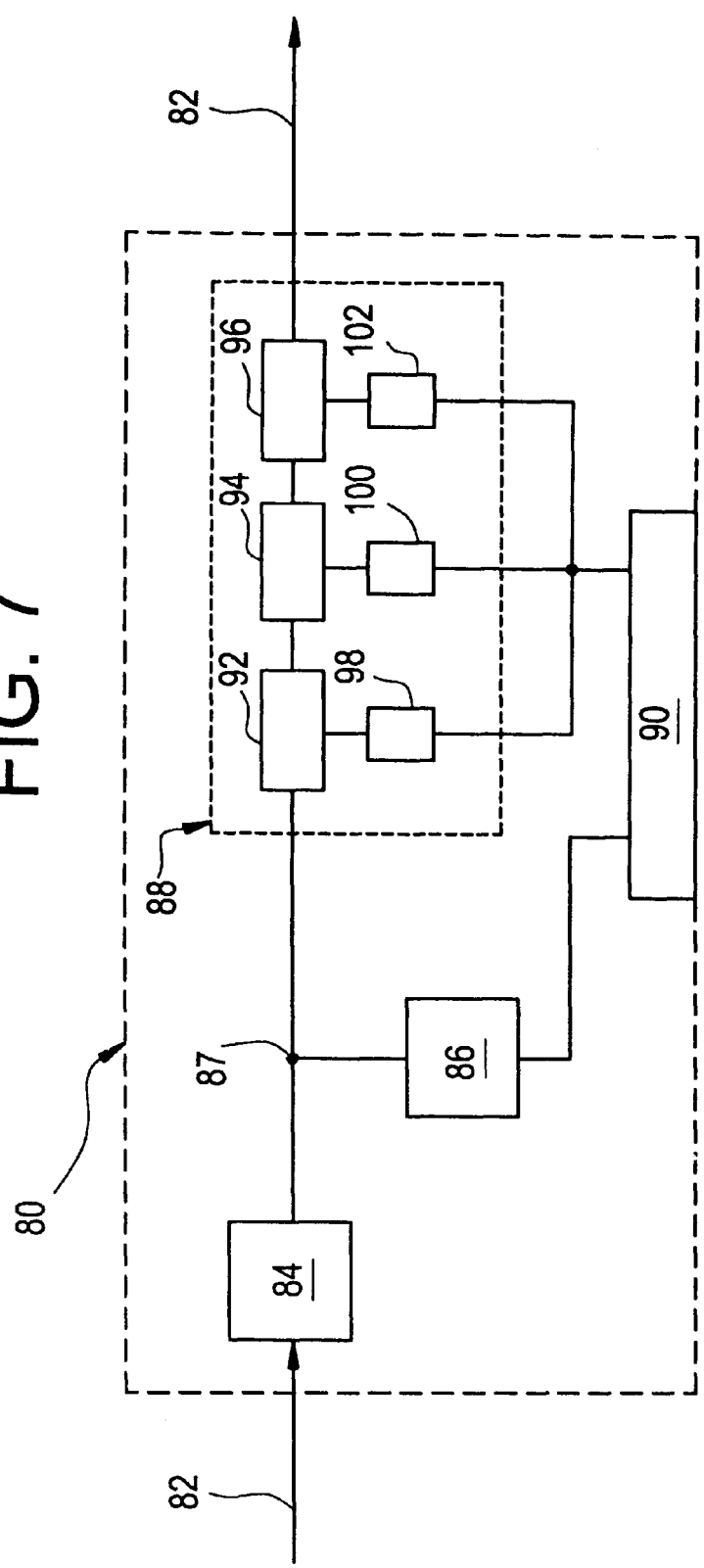
FIG. 7 is a diagram of an optical amplifier module containing a gain flattening filter with amplitude tunable filter modules.

Our invention is depicted as an optical amplifier module 80 in FIG. 7. The module 80 is insertable along an optical pathway 82 of a larger optical system (not shown). Within the module 80 is an optical amplifier 84 (such as an erbium doped fiber amplifier), a spectral monitor 86, a gain flattening filter 88, and a controller 90. Portions of the controller 90, such as a logic board or processor, can be connected to the exterior of the module 80. However, actual control of the gain flattening filter 88 preferably takes place entirely within the module 80.

The spectral monitor 86, which is preferably connected to the optical pathway 82 through a fiber coupler 87 (such as a one percent tap), supplies the controller 90 with information concerning the spectral gain profile of the gain flattening filter 88. Individual components 92, 94, and 96 of the gain flattening filter 88 are independently controllable for attenuating different spectral bands of the gain profile. Preferably, the filter components 92, 94, and 96 are each structured similar to the embodiments of FIG. 1 or 5, but other amplitude tunable components could also be used. The controller 90 operates drivers 98, 100, and 102 associated with each of the filter components 92, 94, and 96 to adjust amplitudes of the spectral bands without significantly shifting central wavelengths of the bands. The resulting filter response profile compensates for unwanted variations in the monitored gain profile.

Passive filters (not shown) can also be incorporated into the module 80 to provide a baseline spectral correction that can be further modified by the controllable components 92, 94, and 96. The gain flattening filter 88 can also be controlled to provide dynamic equalization, where the monitored gain profile reflects system variations including component or fiber insertion loss variations, variations in input signal power, variations associated with adding or dropping channels, environmental variations, and variations associated with aging or other cumulative influences.

Other filters including lattice filters and fused fiber devices can similarly benefit from our invention, particularly those whose couplings between core and cladding modes can be affected by variations in the refractive index of a surrounding overcladding. Refractive index variable overcladdings can be mounted both within and between lattice filter components to further regulate spectral response. In addition to implementing our new amplitude tunable filter in fiber structures, similar benefits can be obtained in planar structures. The overcladding and control layers are preferably laid down against both layers of cladding that straddle the core layer to manage polarization-dependent losses.

Those of skill in the art will appreciate that other modifications and variations can be made in the structure, composition, and methods of the present invention without departing from the spirit or scope of the invention.

We claim:

1. An amplitude tunable filter comprising:
    a waveguide including a core and cladding that guide a light beam having a range of wavelengths along the core and an overcladding positioned directly over and in contact with at least a portion of said cladding;
    at least one coupler that couples at least time band of the wavelengths from the core into the cladding, the one band having a central wavelength;
    wherein said overcladding is in contact with at least a portion of the cladding that is positioned over said at least one coupler, said overcladding having a refractive index that is higher than a refractive index of the cladding;
    the refractive index of the overcladding being subject to change by an external control; and
    a controller that adjusts the refractive index of the overcladding within a range that is higher than the refractive index of the cladding to vary an amplitude of the central wavelength of the band.

2. The filter of claim 1 in which the coupler is athermalized to inhibit a shift in the central wavelength of the band as a function of waveguide temperature.

3. The filter of claim 2 in which the overcladding has a refractive index that varies as a function of temperature.

4. The filter of claim 3 in which the overcladding is an inorganic-organic hybrid material.

5. The filter of claim 4 in which the hybrid material comprises an extended matrix containing silicon and oxygen atoms with at least some of the silicon atoms being directly bonded to substituted or unsubstituted hydrocarbon moieties.

6. The filter of claim 3 in which the overcladding is a polymer.

7. The filter of claim 3 in which the controller operates a temperature conditioner that adjusts the temperature of the overcladding to vary the refractive index of the overcladding within the range that is higher than the refractive index of the cladding.

8. The filter of claim 7 in which the temperature conditioner is a resistive heater in thermal contact with the overcladding.

9. The filter of claim 7 in which the temperature conditioner is a cooler in thermal contact with the overcladding.

10. The filter of claim 1 in which the coupler is located in the waveguide within a region covered by the overcladding.

11. The filter of claim 10 in which the coupler functions as a filter exhibiting a spectral response with at least one band of attenuated wavelengths corresponding to the band coupled from the core into the cladding.

12. The filter of claim 11 in which the coupler is a long period grating.

13. The filter of claim 1 in which the coupler is a tapered portion of the waveguide having a core dimension that diminishes along an axis of beam propagation.

14. The filter of claim 13 in which the overcladding covers the tapered portion of the waveguide.

15. The filter of claim 1 in which the waveguide is mounted to avoid bending.

16. The filter of claim 1 in which the coupler is one of a plurality of couplings formed along the waveguide, at least some of which are covered by other overcladdings having refractive indices that are higher than the refractive index of the cladding.

17. The filter of claim 16 in which each of the couplings couples at least one of a plurality of spectral bands from the core to the cladding, the spectral bands each having central wavelengths.

18. The filter of claim 17 in which the controller operates a plurality of drivers that adjust the refractive indices of the overcladdings within ranges that are higher than the refractive index of the cladding to vary amplitudes of the central wavelengths of the plurality of bands without significantly shifting the central wavelengths of the same bands.

19. The filter of claim 1 in which the overcladding is a solid material that provides structural support for portions of the waveguide within which the coupler is formed.

20. A system that adjusts amplitudes of cladding mode coupled bands of a light beam without significantly shifting wavelengths of the coupled bands by modifying a coupling between a core and a cladding with an overcladding situated directly adjacent to at least a portion of said cladding, without an air layer being locating there between, said overcladding having a refractive index that is higher than a refractive index of the cladding and subject to change as a function of an external control that is provided for varying the refractive index of the overcladding within a range of refractive indices that is greater than the refractive index of the cladding.

21. The system of claim 20 in which the core, the cladding, the overcladding, and the external control form an amplitude tunable filter that compensates for system spectral characteristics that vary as a function of time.

22. The system of claim 21 in which the amplitude tunable filter is one of a plurality of amplitude tunable filters that independently vary amplitudes of different spectral bands of a spectrum intended for transmission through the system.

23. The system of claim 22 including at least one passive filter that compensates for unequal system spectral transmission characteristics that do not vary as a function of time.

24. The system of claim 20 in which the coupling is formed by a perturbation of the core.

25. The system of claim 24 in which the core perturbation is a long period grating.

26. The system of claim 24 in which the core perturbation is a taper that progressively reduces a size of the core.

27. The system of claim 20 in which the coupling is formed by a succession of core perturbations that couple different bands of a system spectrum.

28. The system of claim 27 in which the external control is one of a plurality of external controls that vary amplitudes of the coupled bands without shifting central wavelengths of the bands.

29. The system of claim 20 in which the coupling is athermalized to avoid significantly shifting the wavelengths of the coupled bands as a result of temperature variations in the core.

30. The system of claim 20 in which the overcladding is a solid material that provides structural support for underlying layers of the core and the cladding to resist bending.

31. The system of claim 20 in which the overcladding has a refractive index that varies as a function of temperature.

32. The system of claim 31 in which the overcladding is an inorganic-organic hybrid material.

33. The system of claim 32 in which the hybrid material comprises an extended matrix containing silicon and oxygen atoms with at least some of the silicon atoms being directly bonded to substituted or unsubstituted hydrocarbon moieties.

34. The system of claim 32 in which the hybrid material is a polymer.

35. The system of claim 31 in which the external control is provided by a temperature conditioner that adjusts the temperature of the overcladding to vary the refractive index of the overcladding within the range that is higher than the refractive index of the cladding.

36. The system of claim 20 in which the external control includes a system spectral response monitor and a processor for determining an appropriate adjustment to the refractive index of the overcladding.

37. The system of claim 36 in which the coupling is one of a plurality of couplings and the external control also includes drivers for adjusting magnitudes of the couplings in accordance with the adjustments determined by the processor.

38. A method of compensating for spectral transmission characteristics that vary as a function of time comprising the steps of:
   monitoring spectral transmission characteristics of a system having a spectral range including at least one spectral band that varies in transmission characteristics with time;
   providing a waveguide having an overcladding in direct contact with at least a portion of the cladding, without an air layer there between; and
   adjusting an amplitude of the spectral band without shifting a central wavelength of the band to compensate for the variation in transmission characteristics.

39. The method of claim 38 including the further step of guiding light of the spectral band along a waveguide having a core surrounded by a cladding.

40. The method of claim 39 in which the step of attenuating includes coupling the spectral band into the surrounding cladding.

41. The method of claim 40, wherein said overcladding has a refractive index that is higher than a refractive index of the cladding.

42. The method of claim 41 in which the step of adjusting includes a step of changing the refractive index of the overcladding within a range that is higher than the refractive index of the cladding to vary the amplitude of the spectral band without significantly shifting the central wavelength of the band.

43. The method of claim 42 in which the step of changing includes altering a temperature of the overcladding to vary the refractive index of the overcladding within the range that is higher than the refractive index of the cladding.

44. The method of claim 43 in which the overcladding is an inorganic-organic hybrid material.

45. The method of claim 44 in which the hybrid material comprises an extended matrix containing silicon and oxygen atoms with at least some of the silicon atoms being directly bonded to substituted or unsubstituted hydrocarbon moieties.

46. The method of claim 43 in which the overcladding is a polymer.

47. The method of claim 43 in which the step of guiding includes preserving the central wavelength of the band despite the alterations in the temperature of the overcladding.

48. The method of claim 38 in which the step of attenuating includes attenuating a plurality of different spectral bands that vary in transmission characteristics with time.

49. The method of claim 48 in which the step of adjusting includes separately adjusting amplitudes of the spectral bands without significantly shifting central wavelengths of the bands to compensate for variations in transmission characteristics of the bands.

50. The method of claim 49 in which the step of attenuating the plurality of different spectral bands includes passively attenuating some of the bands by different amounts.

51. A gain flattening filter comprising:
   a waveguide including a core and a cladding that guide a light beam having a range of wavelengths along the core;
   overcladding covering portions of the cladding along a length of the waveguide and having refractive indices that are higher than a refractive index of the cladding;
   an arrangement of couplers located within the portions of the waveguide that are covered by the overcladding for coupling a plurality of bands of the wavelengths from the core into the cladding, each of the bands having a central wavelength;
   the refractive indices of the overcladding being subject to change by an external control; and
   a controller that adjusts the refractive indices of the overcladding within a range that is higher than the refractive index of the cladding to vary amplitudes of the central wavelengths of the coupled bands without significantly shifting the central wavelengths of the coupled bands.

52. The filter of claim 51 in which the couplers are athermalized to inhibit shifts in the central wavelengths of the bands as a function of waveguide temperature.

53. The filter of claim 52 in which the overcladding has a refractive index that varies as a function of temperature.

54. The filter of claim 53 in which the overcladding is an inorganic-organic hybrid material.

55. The filter of claim 53 in which the overcladding is a polymer.

56. The filter of claim 53 in which the controller operates a plurality of temperature conditioners that adjust temperatures of the overcladding to vary the refractive indices of the overcladding within the range that is higher than the refractive index of the cladding.

57. The filter of claim 51 in which the controller receives information from a spectral monitor relating to a gain profile of an amplifier and operates a plurality of drivers that adjust the refractive indices of the other overcladdings to compensate for spectral variations in gain.

58. The filter of claim 51 in which the couplers include at least one long period grating.

59. The filter of claim 51 in which the couplers include at least one tapered coupler.

60. An optical amplifier module having a plurality of components interconnected within the module, the components comprising:
    an optical amplifier that exhibits a spectral gain profile;
    a spectral monitor that monitors the spectral gain profile of the optical amplifier;
    a gain flattening filter including a plurality of separately controllable filter components that attenuate different spectral bands of the gain profile; and
    a controller that adjusts amplitudes of the spectral bands without shifting central wavelengths of the bands to compensate for unwanted variations in the gain profile.

61. The module of claim 60 in which the separately controllable filter components are formed along a waveguide that includes a core, a cladding, and an overcladding covering portions of the cladding along a length of the waveguide.

62. The module of claim 61 in which the overcladding portions have refractive indices that are higher than a refractive index of the cladding.

63. The module of claim 62 in which an arrangement of couplers is located within portions of the waveguide that are covered by the overcladding for coupling a plurality of the spectral bands from the core into the cladding.

64. The module of claim 63 in which the controller adjusts the refractive indices of the overcladding portions within a range that is higher than the refractive index of the cladding to vary amplitudes of the central wavelengths of the coupled bands without significantly shifting the central wavelengths of the coupled bands.

65. A dynamic equalizer for reducing spectral amplitude variations of a fiber optic system comprising:
    a waveguide including a core and cladding that guide a light beam having a range of wavelengths along the core;
    overcladding covering portions of the cladding along a length of the waveguide and having refractive indices that are higher than a refractive index of the cladding;
    an arrangement of couplers located within the portions of the waveguide that are covered by the overcladding for coupling a plurality of bands of the wavelengths from the core into the cladding, each of the bands having a central wavelength;
    the refractive indices of the overcladding being subject to change by an external control;
    a spectral monitor that monitors the spectral amplitude variations of the fiber optic system; and
    a controller that responds to the monitored spectral amplitude variations and adjusts the refractive indices of the overcladding within a range that is higher than the refractive index of the cladding to vary amplitudes of the central wavelengths of the coupled bands without significantly shifting the central wavelengths of the coupled bands.

66. The equalizer of claim 65 in which the couplers are athermalized to inhibit shifts in the central wavelengths of the bands as a function of waveguide temperature.

67. The equalizer of claim 66 in which the overcladding has a refractive index that varies as a function of temperature.

68. The equalizer of claim 67 in which the overcladding is an inorganic-organic hybrid material.

69. The equalizer of claim 67 in which the overcladding is a polymer.

70. The equalizer of claim 67 in which the controller operates a plurality of temperature conditioners that adjust temperatures of the overcladding to vary the refractive indices of the overcladding within the range that is higher than the refractive index of the cladding.

* * * * *